(12) United States Patent
Song et al.

(10) Patent No.: US 12,271,705 B2
(45) Date of Patent: Apr. 8, 2025

(54) CONVERSATION INFORMATION PROCESSING METHOD, APPARATUS, COMPUTER-READABLE STORAGE MEDIUM, AND DEVICE

(71) Applicant: TENCENT TECHNOLOGY (SHENZHEN) COMPANY LIMITED, Shenzhen (CN)

(72) Inventors: Haoyu Song, Shenzhen (CN); Yan Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 348 days.

(21) Appl. No.: 17/974,798

(22) Filed: Oct. 27, 2022

(65) Prior Publication Data

US 2023/0061778 A1 Mar. 2, 2023

Related U.S. Application Data

(63) Continuation of application No. PCT/CN2021/112732, filed on Aug. 16, 2021.

(30) Foreign Application Priority Data

Sep. 14, 2020 (CN) .......................... 202010959812.4

(51) Int. Cl.
G06F 40/35 (2020.01)
G06F 40/205 (2020.01)
G06F 40/279 (2020.01)

(52) U.S. Cl.
CPC ............ *G06F 40/35* (2020.01); *G06F 40/205* (2020.01); *G06F 40/279* (2020.01)

(58) Field of Classification Search
None
See application file for complete search history.

(56) References Cited

U.S. PATENT DOCUMENTS

2015/0058014 A1 2/2015 Lee et al.
2023/0061778 A1* 3/2023 Song .................. G06F 40/35

FOREIGN PATENT DOCUMENTS

CN 106649746 A 5/2017
CN 110083693 A * 8/2019 .......... B25J 11/0005
(Continued)

OTHER PUBLICATIONS

The World Intellectual Property Organization (WIPO) International Search Report for PCT/CN2021/112732 Nov. 18, 2021 8 Pages (including translation).

(Continued)

*Primary Examiner* — Shreyans A Patel
(74) *Attorney, Agent, or Firm* — ANOVA LAW GROUP, PLLC

(57) ABSTRACT

A conversation information processing method, includes: acquiring an attribute structure and a conversation structure that correspond to a target object in response to detecting conversation information to be output; calculating a vector set corresponding to a keyword set; generating a joint semantic vector according to the vector set, and generating a joint structure vector according to the attribute structure and the conversation structure; and determining a degree of matching between the target object and the conversation information according to the joint semantic vector and the joint structure vector, and outputting the conversation information in response to the degree of matching meeting a preset condition.

20 Claims, 8 Drawing Sheets

(56) References Cited

FOREIGN PATENT DOCUMENTS

| CN | 110209897 | A |   | 9/2019  |              |
|----|-----------|---|---|---------|--------------|
| CN | 111209367 | A | * | 5/2020  | G06F 16/3334 |
| CN | 111930915 | A |   | 11/2020 |              |
| CN | 110083693 | B | * | 3/2021  | B25J 11/0005 |

OTHER PUBLICATIONS

Samuel R Bowman et al. "A large annotated corpus for learning natural language inference", 2015, In Proceedings of the 2015 Conference on Empirical Methods in Natural Language Processing.

Adina Williams et al. "A Broad-Coverage Challenge Corpus for Sentence Understanding through Inference". 2018, In Proceedings of the 2018 Conference of the North American Chapter of the Association for Computational Linguistics: Human Language Technologies, New Orleans, Louisiana.

Tushar Khot et al. "SCITAIL: A Textual Entailment Dataset from Science Question Answering", 2018, Thirty-Second AAAI Conference on Artificial Intelligence.

Sean Welleck et al. "Dialogue Natural Language Inference", 2019, In Proceedings of the 57th Annual Meeting of the Association for Computational Linguistics, Florence, Italy.

Qian Chen et al. "Enhanced LSTM for Natural Language Inference", 2017, p. 1657-1668, In Proceedings of the 55th Annual Meeting of the Association for Com-putational Linguistics, Vancouver, Canada.

Jacob Devlin et al. "BERT: Pre-training of Deep Bidirectional Transformers for Language Understanding", 2019, p. 4171-4186, In Proceedings of the 2019 Conference of the North American Chapter of the Association for Computational Linguistics: Human Language Technologies, Minneapolis, Minnesota.

Dozat Timothy et al. "Deep Biaffine Attention for Neural Dependency Parsing".

"Languge Technology Platform", Jan. 10, 2016, p. 1-13, Harbin Institute of Technology.

* cited by examiner

CONVERSATION INFORMATION PROCESSING METHOD, APPARATUS, COMPUTER-READABLE STORAGE MEDIUM, AND DEVICE

CROSS-REFERENCES TO RELATED APPLICATIONS

This application is a continuation application of PCT Patent Application No. PCT/CN2021/112732, entitled "CONVERSATION INFORMATION PROCESSING METHOD AND APPARATUS, COMPUTER-READABLE STORAGE MEDIUM, AND DEVICE" and filed on Aug. 16, 2021, which claims priority to Chinese Patent Application No. 2020109598124, entitled "CONVERSATION INFORMATION PROCESSING METHOD, APPARATUS, COMPUTER-READABLE STORAGE MEDIUM, AND DEVICE" filed on Sep. 14, 2020, the entire contents of both of which are incorporated herein by reference.

FIELD OF THE TECHNOLOGY

The present disclosure relates to the technical field of artificial intelligence, and in particular, to a conversation information processing method, a conversation information processing apparatus, a computer-readable storage medium, and an electronic device.

BACKGROUND OF THE DISCLOSURE

With continuous development of computer technologies, emerging virtual idols are favored by more and more people. Users can watch the virtual idols singing and dancing through terminal devices, and can also chat with the virtual idols. In fact, the virtual idols are technological products, with display and interaction manners controlled by programs. Replies of the virtual idols to chat messages perceived by the users are actually reply results generated by a computer according to the chat messages. Generally, different virtual idols have corresponding attribute settings, and the users can choose virtual idols according to preferences for viewing and chatting. To create a more realistic virtual idol, how to match information returned by the virtual idols with the attribute settings of the virtual idols is an urgent problem to be resolved.

SUMMARY

According to various embodiments of the present disclosure, a conversation information processing method, a conversation information processing apparatus, a computer-readable storage medium, and an electronic device are provided.

A conversation information processing method is provided, performed by an electronic device, the method including: acquiring an attribute structure and a conversation structure that correspond to a target object in response to detecting conversation information to be output; the conversation structure being used for representing the conversation information; calculating a vector set corresponding to a keyword set; the keyword set including keywords in the attribute structure and keywords in the conversation structure; generating a joint semantic vector according to the vector set, and generating a joint structure vector according to the attribute structure and the conversation structure; and determining a degree of matching between the target object and the conversation information according to the joint semantic vector and the joint structure vector, and outputting the conversation information in response to the degree of matching meeting a preset condition.

A conversation information processing apparatus is provided, including: a data acquisition unit, a vector calculation unit, and a condition judgment unit, the data acquisition unit being configured to acquire an attribute structure and a conversation structure that correspond to a target object in response to detecting conversation information to be output; the conversation structure being used for representing the conversation information; the vector calculation unit being configured to calculate a vector set corresponding to a keyword set; the keyword set including keywords in the attribute structure and keywords in the conversation structure; the vector calculation unit being further configured to generate a joint semantic vector according to the vector set, and generate a joint structure vector according to the attribute structure and the conversation structure; and the condition judgment unit being configured to determine a degree of matching between the target object and the conversation information according to the joint semantic vector and the joint structure vector, and output the conversation information in response to the degree of matching meeting a preset condition.

An electronic device is provided, including: a processor; and a memory, configured to store executable instructions of the processor, the processor being configured to execute the executable instructions to perform the method according to any one of the above descriptions.

A non-transitory computer-readable storage medium is provided, storing a computer program, the computer program, when executed by a processor, implementing the method according to any one of the above descriptions.

It is to be understood that the foregoing general descriptions and the following detailed descriptions are merely exemplary and explanatory, and are not intended to limit the present disclosure.

BRIEF DESCRIPTION OF THE DRAWINGS

Accompanying drawings herein are incorporated into and constitute a part of this specification, show embodiments that conform to the present disclosure, and are used together with this specification to describe the principle of the present disclosure. Obviously, the accompanying drawings in the following descriptions are merely some embodiments of the present disclosure, and a person of ordinary skill in the art may further obtain other accompanying drawings according to the accompanying drawings without creative efforts.

DESCRIPTION OF EMBODIMENTS

Exemplary implementations are now described more comprehensively with reference to the accompanying drawings. However, the examples of implementations may be implemented in various forms, and it should not be understood as being limited to the examples described herein. Conversely, the implementations are provided to make the present disclosure more comprehensive and complete, and comprehensively convey the idea of the examples of the implementations to a person skilled in the art. The described features, structures, or characteristics may be combined in one or more implementations in any appropriate manner. In the following description, many specific details are provided to give a full understanding of the implementations of the present disclosure. However, it is to be appreciated by a person skilled in the art that one or more of the specific details may be omitted during practice of the technical solutions of the present disclosure, or other methods, components, apparatus, steps, or the like may be used. In other cases, well-known technical solutions are not shown or described in detail to avoid overwhelming the subject and thus obscuring various aspects of the present disclosure.

In addition, the accompanying drawings are only schematic illustrations of the present disclosure and are not necessarily drawn to scale. The same reference numbers in the accompanying drawings represent the same or similar parts, and therefore, repeated descriptions thereof are omitted. Some of the block diagrams shown in the accompanying drawings are functional entities and do not necessarily correspond to physically or logically independent entities. Such functional entities may be implemented in the form of software, or implemented in one or more hardware modules or integrated circuits, or implemented in different networks and/or processor apparatuses and/or micro-controller apparatuses.

Figure 1:
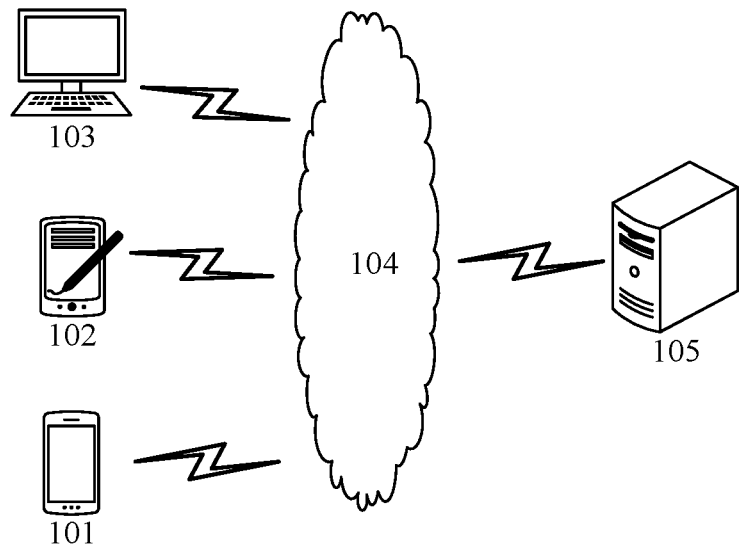
FIG. 1 is a schematic diagram of an exemplary system architecture to which a conversation information processing method and a conversation information processing apparatus according to embodiments of the present disclosure can be applied.

FIG. 1 is a schematic diagram of a system architecture of an exemplary application environment to which a conversation information processing method and a conversation information processing apparatus according to embodiments of the present disclosure are applicable.

As shown in FIG. 1, a system architecture 100 may include one or more of terminal devices 101, 102, and 103, a network 104, and a server 105. The network 104 is configured to provide a medium of a communication link between the server 105 and the terminal devices 101, 102, and 103. The network 104 may include various connection types, such as a wired or wireless communication link, or a fiber optic cable. The terminal device 101, 102, 103 may be various electronic devices having display screens, including but not limited to a desktop computer, a portable computer, a smartphone, a tablet computer, and the like. It is to be understood that the quantities of terminal devices, networks, and servers in FIG. 1 are only schematic. There may be any quantities of terminal devices, networks and servers according to an actual requirement. For example, the server 105 may be a server cluster including a plurality of servers. In addition, the server 105 may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a content delivery network (CDN), big data, and an artificial intelligence platform. The terminal may be a smartphone, a tablet computer, a notebook computer, a desktop computer, a smart speaker, a smartwatch, or the like, but is not limited thereto. The terminal and the server may be directly or indirectly connected in a wired or wireless communication manner. This is not limited in the present disclosure.

The cloud server may provide a basic cloud computing service by using a cloud technology. The cloud technology is a hosting technology that unifies a series of resources such as hardware, software, and networks in a wide area network or a local area network to implement computing, storage, processing, and sharing of data.

Cloud computing included in the basic cloud computing service refers to a delivery and usage mode of an information technology (IT) infrastructure, that is, obtaining required resources by using a network in an on-demand and ease-of-scalability manner. In a broad sense, cloud computing refers to a delivery and usage mode of a service, that is, obtaining a required service by using a network in an on-demand and ease-of-scalability manner. The service may relate to IT, software, and Internet, and may also be another service. Cloud computing is a product resulted from development and convergence of existing computer technologies and network technologies, such as grid computing, distributed computing, parallel computing, utility computing network storage technologies, virtualization, and load balance.

Moreover, cloud storage included in the basic cloud computing service is a new concept extended and developed from the concept of cloud computing. A distributed cloud storage system (hereinafter referred to as a storage system) is a storage system that integrates a large number of different types of storage devices (also referred to as storage nodes) in a network through application software or application interfaces to work together by using functions such as a cluster application, a grid technology, and a distributed storage file system, to jointly provide data storage and service access functions externally. Currently, a storage method for the storage system includes: creating logical volumes, and allocating a physical storage space to each logical volume during creation of the logical volumes. The physical storage space may be formed by a disk of a storage device or disks of several storage devices. A client stores data on a logical volume, that is, stores the data on a file system. The file system divides the data into many parts. Each part is an object. The object includes data as well as additional information such as data identity (ID). The file system writes each object to the physical storage space of the logical volume, and the file system may record storage position information of each object, so that the file system can allow the client to access the data according to the storage position information of each object when the client requests access to the data. A process of allocating the physical storage space to the logical volume by the storage system specifically includes: dividing the physical storage space into stripes in advance according to a capacity estimate (the estimate generally has a large margin over an actual capacity of a to-be-stored object) for an object stored in the logical volume and a category of a Redundant Array of Independent Disk (RAID). A logical volume may be understood as a stripe, so as to allocate the physical storage space to the logical volume.

A database (DB) included in the basic cloud computing service may be considered as an electronic file cabinet, that is, a place for storing an electronic file. A user may perform an operation such as add, query, update, or delete data in the file. The so-called "database" is a data set that is stored together in a particular manner and can be shared by a plurality of users, has as less redundancy as possible, and is independent of an application program.

Moreover, big data included in the basic cloud computing service refers to a set of data that cannot be captured, managed, and processed by existing software tools within a certain time range. The big data is high-volume, high-velocity, and high-variety information assets that require new processing modes to enable enhanced decision-making, insight discovery, and process optimization. With the advent of the cloud era, the big data also attracts more attention, and the big data requires a special technology to efficiently process a large amount of data that tolerates elapsed time. Technologies applicable to the big data include large-scale parallel processing databases, data mining, distributed file systems, distributed databases, cloud computing platforms, the Internet, and scalable storage systems.

The conversation information processing method provided in the embodiments of the present disclosure is generally performed by the server 105, and accordingly, the conversation information processing apparatus is generally disposed in the server 105. However, it is easy for a person skilled in the art to understand that the conversation information processing method according to the embodiment of the present disclosure may also be performed by a terminal device 101, 102 or 103, and accordingly, the conversation information processing apparatus may also be disposed in the terminal device 101, 102 or 103, which are not specially limited in the exemplary embodiment. For example, in an exemplary embodiment, the server 105 may acquire an attribute structure and a conversation structure that correspond to a target object in response to detecting conversation information to be output; the conversation structure being used for representing the conversation information; calculate a vector set corresponding to a keyword set; the keyword set including keywords in the attribute structure and keywords in the conversation structure; generate a joint semantic vector according to the vector set, and generate a joint structure vector according to the attribute structure and the conversation structure; and determine a degree of matching between the target object and the conversation information according to the joint semantic vector and the joint structure vector, and output the conversation information in response to the degree of matching meeting a preset condition.

Figure 2:
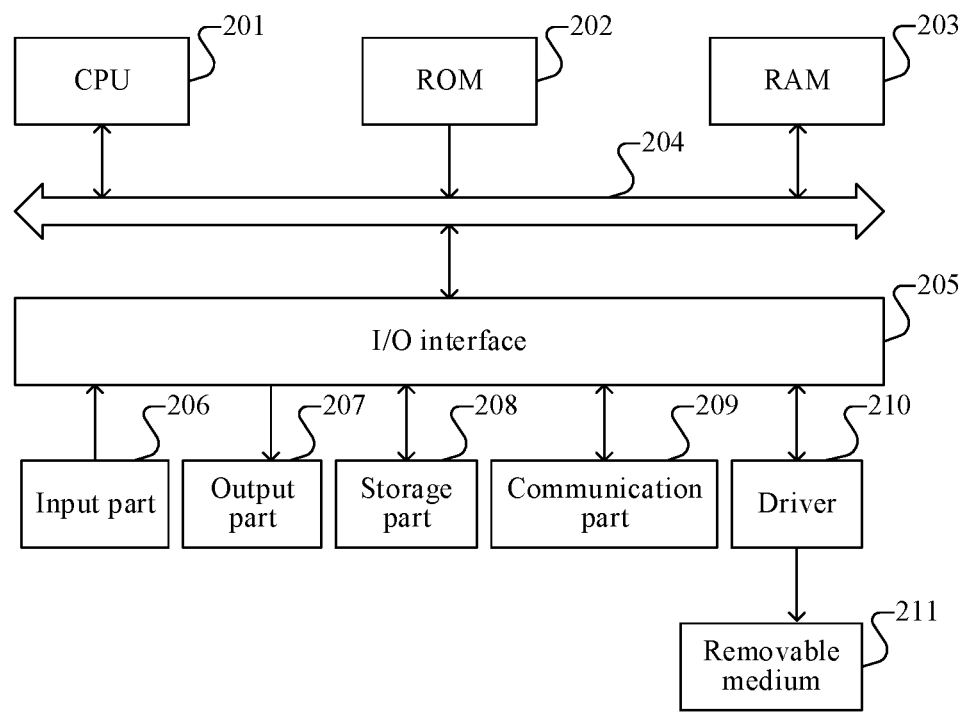
FIG. 2 is a schematic structural diagram of a computer system adapted to implement an electronic device according to an embodiment of the present disclosure.

FIG. 2 is a schematic structural diagram of a computer system adapted to implement an electronic device according to an embodiment of the present disclosure.

The computer system 200 of the electronic device shown in FIG. 2 is merely an example, and does not constitute any limitation on functions and use ranges of the embodiments of the present disclosure.

As shown in FIG. 2, the computer system 200 includes a central processing unit (CPU) 201, which can perform various appropriate actions and processing according to a program stored in a read-only memory (ROM) 202 or a program loaded into a random access memory (RAM) 203 from a storage part 208. The RAM 203 further stores various programs and data necessary for system operations. The CPU 201, the ROM 202, and the RAM 203 are connected to each other by using a bus 204. An input/output (I/O) interface 205 is also connected to the bus 204.

The following components are connected to the I/O interface 205: an input part 206 including a keyboard, a mouse, or the like; an output part 207 including a cathode ray tube (CRT), a liquid crystal display (LCD), a speaker, or the like; a storage part 208 including a hard disk or the like; and a communication part 209 of a network interface card, including a LAN card, a modem, or the like. The communication part 209 performs communication processing through a network such as the Internet. A driver 210 is also connected to the I/O interface 205 as needed. A removable medium 211, such as a magnetic disk, an optical disc, a magneto-optical disk, or a semiconductor memory, is installed on the driver 210 as required, so that a computer program read therefrom is installed into the storage part 208 as required.

Particularly, according to the embodiments of the present disclosure, the processes described in the following by referring to the flowcharts may be implemented as computer software programs. For example, the embodiments of the present disclosure include a computer program product, the computer program product includes a computer program carried on a computer-readable medium, and the computer program includes program code used for performing the methods shown in the flowcharts. In such an embodiment, the computer program may be downloaded from a network via the communication part 209 and installed, and/or installed from the removable medium 211. When the computer program is executed by the CPU 201, various functions defined in the method and apparatus of the present disclosure are executed.

In the related art, a user may chat with other users through a platform with a chat function. However, as the pace of modern life is getting faster and faster, when a user A needs to chat, a user B may be busy and cannot meet the user A's need in time. Moreover, different users generally prefer different chat objects. When the user B preferred cannot chat, a user C may not be busy but the user C is not the user A's preferred user. Thus, a situation where a user's chat need cannot be met in time happens occasionally.

It occurs to the applicant that virtual online profiles may be designed, so that the user can chat with a preferred virtual online profile at any time in need of a chat, so as to meet the user's instant chat need. Specifically, it also occurs to the applicant that the virtual online profile may correspond to a dialog system. The dialog system may generate corresponding reply messages according to attribute information of the virtual online profile and chat content transmitted by the user, so as to meet the user's instant chat need.

Based on the related art, a natural language inference (NLI) management system may be applied to the above dialog system. However, based on temporal characteristics of NLI, in general, important information may be easily ignored due to no temporal relation between attributes when attribute information (such as name, gender, and location) of the online virtual profile is modeled, which may lead to mismatch between the generated reply messages and the attribute information, that is, inconsistency between the reply messages and the setting of the online virtual profile, thereby easily affecting the user's immersive chat experience.

For example, the attribute information of the online virtual profile is as follows.

| Name | Little H |
|---|---|
| Gender | Female |
| Location | City A |
| Constellation | Aquarius |
| Age | 16 |

The above attribute information may be modeled according to NLI. If the user's chat content is "I'm going to City A", dialog information generated by Little H according to the chat content may include the following options R1 to R3: R1: I'm very glad you can come to City A; R2: I also want to go to City A one day; and R3: I'll show you around XX University after you come. Since the location of Little H is City A, the generated R2 is inconsistent/contradicted with the attribute information of Little H.

Thus, as a result of NLI modeling based on the temporal relation, the generated R2 is inconsistent/contradicted with the above attribute information. If R2 is outputted for the user's chat content, it easily causes mismatch between reply content and the attribute information, thereby affecting the user's immersive chat experience.

Figure 3:
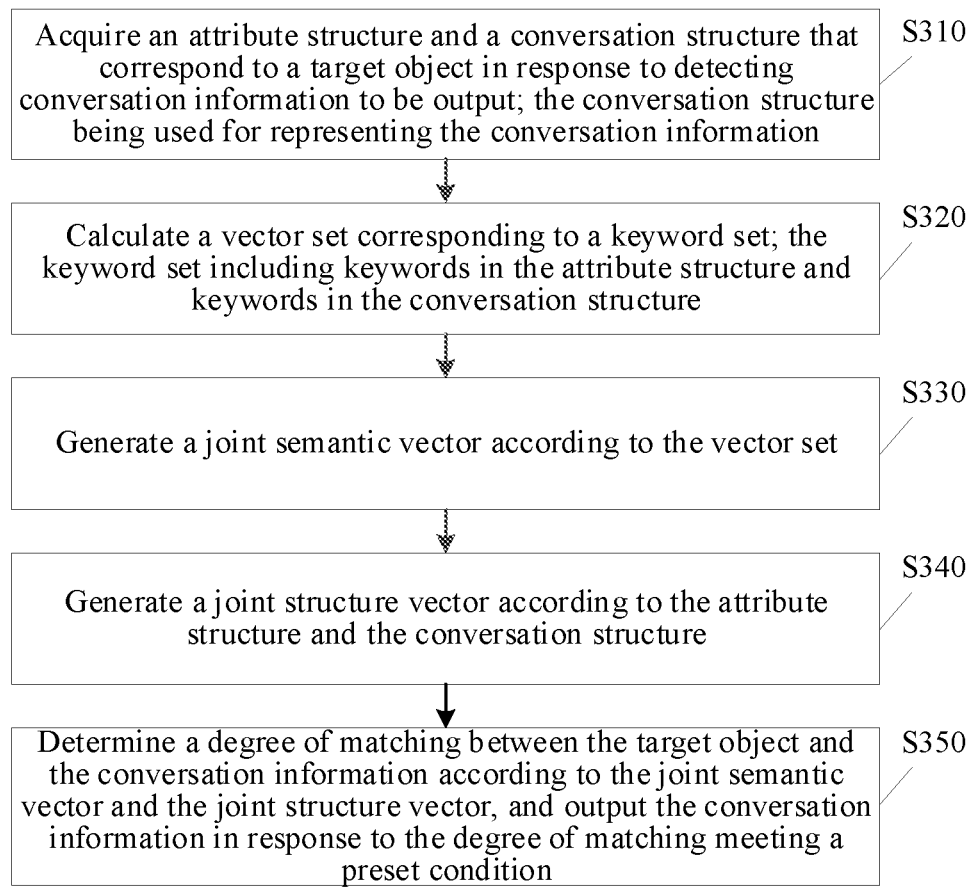
FIG. 3 schematically shows a flowchart of a conversation information processing method according to an embodiment of the present disclosure.

Based on the technical problem raised in the above content, the exemplary embodiment provides a conversation information processing method. The conversation information processing method is applicable to the above server 105 or applicable to one or more of the terminal devices 101, 102, and 103, which is not specially limited in the exemplary embodiment. Referring to FIG. 3, the conversation information processing method may include the following steps S310 to S350.

Step S310: Acquire an attribute structure and a conversation structure that correspond to a target object in response to detecting conversation information to be output; the conversation structure being used for representing the conversation information. In some embodiments, the conversation information is a chat message. The chat message may be automatically generated by a chat bot.

Step S320: Calculate a vector set corresponding to a keyword set; the keyword set including keywords in the attribute structure and keywords in the conversation structure.

Step S330: Generate a joint semantic vector according to the vector set.

Step S340: Generate a joint structure vector according to the attribute structure and the conversation structure.

Step S350: Determine a degree of matching between the target object and the conversation information according to the joint semantic vector and the joint structure vector, and output the conversation information in response to the degree of matching meeting a preset condition.

It may be understood that the present disclosure is applicable to a dialog system between a user and a virtual profile to improve a degree of matching between the virtual profile's reply to the user and a setting of the virtual profile, so as to make the virtual profile perceived by the user more vivid and prevent feeling of incompatibility caused by mismatch between the reply content and the setting of the virtual profile.

With the implementation of the method shown in FIG. 3, accuracy of the calculated degree of matching between the conversation information and the target object can be improved, so that the conversation information can be outputted when the degree of matching meets the preset condition, and the conversation information returned by the target object matches the attribute structure of the target object. In addition, consistency between the target object and the outputted conversation information can also be improved, and authenticity of the target object can be improved.

The above steps in the exemplary embodiment are described in more detail below.

In step S310, the attribute structure and the conversation structure that correspond to the target object are acquired in response to detecting the to-be-outputted conversation information; where the conversation structure is used for representing the conversation information.

Specifically, the target object may be either a real user participating in a conversation or a virtual user participating in the conversation (e.g., an AI anchor), which is not limited in the embodiment of the present disclosure. In addition, the above attribute structure may be used as a personalized description of the target object. The attribute structure may include the following keywords: gender, address, constellation, age, occupation, and the like. For example, the attribute structure may be expressed as: {Gender: male, Location: City S, Constellation: Leo, Age: 20, Occupation: researcher} or {Gender: female, Location: City A, Constellation: Leo}, etc. The attribute structure may be represented by a plurality of attribute keywords, and the conversation structure may also be represented by a plurality of conversation keywords.

The conversation information may be dialog messages for the target object to communicate with other conversation objects. For example, assuming that the target object is a virtual user and the other conversation objects are real users, the conversation information is dialog messages in reply to chat messages transmitted by the real user. The conversation keywords are derived from the conversation information. For example, the conversation structure may be expressed as: {I'm, very, glad, you, can, come, to, City A}. The conversation structure may further include a semantic relation between the keywords.

In one embodiment, prior to the acquiring an attribute structure and a conversation structure that correspond to a target object, the method further includes: determining, in response to detecting that a new chat message is displayed in a conversation window, the conversation information corresponding to the new chat message; where the conversation window includes the target object and at least one conversation object, and the new chat message corresponds to the conversation object. The new chat message may be a new chat message for chatting with the target object, for example, a message transmitted when the real user chats with the virtual user.

Specifically, the new chat message may include: text information, text information plus image information or text information plus emojis. The new chat message may include information corresponding to the conversation object (e.g., @user 1). In addition, in some embodiments, prior to the determining the conversation information corresponding to the new chat message, the method may further include: detecting, according to a preset unit time length (e.g., 10 ms), whether the new chat message exists in the conversation window.

Thus, with the implementation of the previously described embodiment, when a chat message corresponding to the target object and entered by the user is detected, the chat message can be responded according to attributes of the target object, which provides a chat function to meet the user's instant chat need.

In one embodiment, the determining the conversation information corresponding to the new chat message includes: selecting the conversation information from a preset information base according to the new chat message; or generating the conversation information according to the new chat message.

Specifically, the preset information base is used for storing a variety of callable preset conversation information. Then, a manner of selecting the conversation information from a preset information base according to the new chat message may include: determining a chat keyword (e.g., weather) in the new chat message, and selecting the conversation information (e.g., "It's cloudy today," "It's not going to rain today," or "It's not going to shine today") from the preset information base according to the chat keyword.

In some embodiments, a manner of generating the conversation information according to the new chat message may include: determining a chat keyword in the new chat message, and generating the conversation information according to the chat keyword and the attribute structure of the target object. The conversation information may include an attribute keyword in the attribute structure.

Thus, with the implementation of the previously described embodiment, corresponding conversation information can be determined according to content of the new chat message entered by the user. In this way, the user's chat experience can be improved, and an irrelevant answer is prevented to some extent.

In one embodiment, the acquiring an attribute structure and a conversation structure that correspond to a target object includes: reading the attribute structure corresponding to the target object; and structuring the conversation information to obtain the conversation structure.

Specifically, the target object may correspond to a plurality of groups of attribute structures. For example, a plurality of groups of attribute structures corresponding to the target object Little H may be as follows: {Gender: female, Age: 16, Location: City A, Constellation: Aries}, {Gender: female, Age: 16, Location: City B, Constellation: Leo}, and {Gender: female, Age: 16, Location: City C, Constellation: Virgo}.

Then, a manner of reading the attribute structure corresponding to the target object may include: determining a target object setting corresponding to the new chat message, and reading the attribute structure corresponding to the target object setting. Different target object settings correspond to different attribute structures, and the user may personalize a selection of a target object setting according to a preference.

Further, prior to the reading the attribute structure corresponding to the target object, the following steps may also be performed: representing different target object settings through different virtual images and displaying the virtual images; and determining, in response to detecting an interaction operation acting on a target virtual image, a target object setting corresponding to the target virtual image to be the target object setting corresponding to the new chat message.

Thus, with the implementation of the previously described embodiment, the attribute structure and the conversation structure of the target object can be determined, thereby helping to determine the degree of matching between the target object and the conversation information according to the attribute structure and the conversation structure to prevent mismatch between the outputted conversation information and the target object.

In one embodiment, the structuring the conversation information to obtain the conversation structure includes: determining a term vector corresponding to the conversation information according to a term vector model; performing text structure parsing on the conversation information according to the term vector to obtain a semantic relation between linguistic units in the conversation information; and representing the conversation information as the conversation structure according to the semantic relation.

Specifically, the text structure parsing may include semantic dependency parsing (SDP). The SDP is used for analyzing the semantic relation between linguistic units in the conversation information and presenting the semantic relation by a dependency tree (DT). The semantic relation may include the following types: an agent relation (Agt), an experiencer relation (Exp), an affection relation (Aft), a possessor relation (Poss), a patient relation (Pat), a content relation (Cont), a product relation (Prod), and the like. In addition, the conversation structure may be used for representing linguistic units and a semantic relation between the linguistic units. In addition, the term vector model may be Global Vectors for Word Representation (GloVe). GloVe is a term representation tool based on global word frequency statistics, which may express a term into a vector formed by real numbers. The vector is used for representing semantic properties of the term.

Then, a manner of performing text structure parsing on the conversation information according to the term vector to obtain a semantic relation between linguistic units in the conversation information may include: performing SDP on the conversation information according to the term vector to obtain the semantic relation between the linguistic units in the conversation information. The linguistic units (e.g., I'm, very, glad, you, can, come, to, City A) may be conversation keywords. Alternatively, abstract meaning representation (AMR) is performed on the conversation information according to the term vector to obtain the semantic relation between the linguistic units in the conversation information. AMR is a meaning representation method, with a basic structure of "singly rooted directed acyclic graph". Through the AMR, content words can be abstracted into concepts to serve as nodes on the singly rooted directed acyclic graph, and function words with no real meaning can be abstracted into edges.

In some embodiments, the method may further include the following steps:

constructing a co-occurrence matrix X according to a corpus;

constructing a term vector model for representing an approximation relation between term vectors and X:

$$\omega_i^T \tilde{\omega}_j + b_i + \tilde{b}_j = \log(X_{ij});$$

where $\omega_i^T$ and $\tilde{\omega}_j$ are used for representing term vectors, and $b_i$ and $\tilde{b}_j$ are used for representing bias terms of the term vectors;

determining a loss function expression according to the term vector model: J $$J = \Sigma_{i,j=1}^{V} f(X_{ij})(\omega_i^T \tilde{\omega}_j + b_i + \tilde{b}_j - (\log(X_{ij})))^2;$$

where $f(X_{ij})$ denotes a non-decreasing weight function, $f(0)=0$; and adjusting model parameters of the term vector model according to the loss function expression and sample output results of the term vector model, so as to realize pre-training of the term vector model. An element $X_{ij}$ in the co-occurrence matrix X may represent a number of times that a word i and a context word j co-occur in a context window of a preset size. For example, $f(X_{ij})$ may be expressed as $$f(x) = \begin{cases} \left(\dfrac{x}{x_{max}}\right)^\alpha & \text{if } x < x_{max} \\ 1 & \text{if } x \geq x_{max} \end{cases};$$

where $\alpha$ is a constant, for example, 0.75.

In some embodiments, if the semantic relation between the linguistic units in the conversation information is not obtained after text structure parsing is performed on the conversation information according to the term vector, the following step may be performed: returning a failure prompt.

Thus, with the implementation of the previously described embodiment, the conversation information can be structured by semantically parsing the conversation information, thereby helping to determine the degree of matching between the target object and the conversation information.

In another embodiment, the structuring the conversation information to obtain the conversation structure includes: comparing the conversation information with a preset word set to determine keywords in the conversation information; and constructing a conversation structure including the keywords in the conversation information according to a preset word relation.

Specifically, the preset word set may include pre-stored words, and the preset word relation may be a preset one-to-one correspondence and used for representing a relation between adjacent linguistic units.

Thus, with the implementation of the previously described embodiment, the conversation structure corresponding to the conversation information can be determined according to preset information, so that the degree of matching can be jointly determined based on the conversation structure and the attribute structure to improve accuracy of the calculation of the degree of matching.

In step S320, the vector set corresponding to the keyword set is calculated. The keyword set includes keywords in the attribute structure and keywords in the conversation structure.

Specifically, the vector set may include: a keyword vector, a position vector, a category vector, and a separation vector. For example, if the attribute structure is {Gender: female, Location: Beijing, Constellation: Leo} and the conversation structure is {I'm, very, glad, you, can, come, to, City A}, the keyword set may be {Gender, female, Location, Beijing, Constellation, Leo, [SEP], I'm, very, glad, you, can, come, to, City A}. [SEP] is a clause symbol and used for separating keyword corpora.

In one embodiment, the calculating a vector set corresponding to a keyword set includes: determining keyword vectors of keywords in the keyword set according to a preset vector relation; determining position vectors corresponding to the keywords according to position information of the keywords; determining category vectors of the keywords according to categories respectively corresponding to the keywords; determining separation vectors of the keywords according to the attribute structure and the conversation structure; where the separation vectors of the keywords in the attribute structure are the same, and the separation vectors of the keywords in the conversation structure are the same; performing para addition on the keyword vectors, the position vectors, the category vectors, and the separation vectors corresponding to same keywords to obtain target vectors to be processed respectively corresponding to the keywords; and determining a set of the target vectors (also referred as to-be-processed vectors) respectively corresponding to the keywords to be the vector set.

Specifically, the preset vector relation may be used for representing a one-to-one correspondence between different keywords and keyword vectors. The keyword vectors may be a list of real numbers, and the keyword vectors corresponding to the keywords in the keyword set may correspond to a same dimension (e.g., 768). In addition, the above para addition is used for representing a sum of elements at same positions among the keyword vectors, the position vectors, the category vectors, and the separation vectors. For example, after the para addition (1+2+3+4, 1+2+3+4, 1+2+3+4) of the keyword vector (1, 1, 1), the position vector (2, 2, 2), the category vector (3, 3, 3), and the separation vector (4, 4, 4) corresponding to the keyword "weather", a to-be-processed vector (10, 10, 10) corresponding to the keyword "weather" can be obtained.

In some embodiments, a manner of determining position vectors corresponding to the keywords according to position information of the keywords may include: performing, if an even number of pieces of position information are provided, sinusoidal encoding on keywords corresponding to the position information; and performing, if an odd number of pieces of position information are provided, cosinoidal encoding on keywords corresponding to the position information, so as to obtain position vectors corresponding to the keywords.

In some embodiments, a manner of determining category vectors of the keywords may be determined according to categories respectively corresponding to the keywords may include: representing keywords (e.g., "gender" and "male") corresponding to a same category by a unified category vector. Keywords of different categories correspond to different category vectors.

In some embodiments, a manner of determining separation vectors of the keywords according to the attribute structure and the conversation structure may include: representing keywords belonging to the attribute structure by a same separation vector, and representing keywords belonging to the conversation structure by a same separation vector. The keywords in the attribute structure and the keywords in the conversation structure correspond to different separation vectors.

Thus, with the implementation of the previously described embodiment, different types of vectors corresponding to the keywords can be calculated, and the vectors are fused to obtain to-be-processed vectors corresponding to the keywords, so as to calculate the degree of matching between the target object and the conversation information according to a set of the to-be-processed vectors to improve accuracy of the calculation of the degree of matching.

In one embodiment, prior to the determining position vectors corresponding to the keywords according to position information of the keywords, the method further includes: concatenating the keywords in the attribute structure and the keywords in the conversation structure; and sequentially annotating position information for the keywords in the keyword set according to a keyword sorting order of concatenating results to obtain the position information of the keywords.

The concatenating results include attribute keywords of the attribute structure and conversation keywords in the conversation structure. The position information may be represented by numerical values.

In some embodiments, a manner of concatenating the keywords in the attribute structure and the keywords in the conversation structure may include: concatenating the keywords in the attribute structure and the keywords in the conversation structure in order according to a clause symbol (e.g., {Gender, female, Location, Beijing, Constellation, Leo, [SEP], I'm, very, glad, you, can, come, to, City A}). For example, the position information annotated according to the keyword sorting order may be expressed as follows:

| Gender | Female | Location | Beijing | Constellation | Leo | [SEP] | I'm | very | glad | you | can | come | to | City A |
|--------|--------|----------|---------|---------------|-----|-------|-----|------|------|-----|-----|------|----|--------|
| 1      | 2      | 3        | 4       | 5             | 6   | 7     | 8   | 9    | 10   | 11  | 12  | 13   | 14 | 15     |

Thus, with the implementation of the previously described embodiment, the position information of the keywords can be annotated, thereby helping to calculate position vectors of the keywords to improve accuracy of subsequent calculation of the degree of matching.

In step S330, the joint semantic vector is generated according to the vector set.

In some embodiments, a manner of generating a joint semantic vector according to the vector set may include: inputting the vector set into a Bidirectional Encoder Representations from Transformers (BERT) model, so that the BERT generates the joint semantic vector according to the vector set. The joint semantic vector is used for representing an output probability of each keyword. BERT is a language parsing model.

In step S340, the joint structure vector is generated according to the attribute structure and the conversation structure.

In some embodiments, a manner of generating a joint structure vector according to the attribute structure and the conversation structure may include: inputting the attribute structure and the conversation structure into a Long Short Term Memory networks (LSTM) model for a component tree (i.e., Tree LSTM), so that the Tree LSTM generates the joint structure vector according to the attribute structure and the conversation structure. The generated joint structure vector is a vectorized representation of the attribute structure and the conversation structure.

In some embodiments, prior to the inputting the vector set into a BERT model, the following step may also be performed: training the BERT model according to a preset loss function. The preset loss function may be a regression loss function, a squared error loss function, an absolute error loss function, a Huber loss function, a dichotomous loss function, a dichotomous cross-entropy, a Hinge loss function, a multi-classification loss function, a multi-classification cross-entropy loss, or Kullback Leibler (KL) divergence loss, which is not limited in the embodiment of the present disclosure. Similarly, prior to the inputting the attribute structure and the conversation structure into a Tree LSTM model, the following step may also be performed: training the Tree LSTM model according to the preset loss function.

In one embodiment, the generating a joint semantic vector according to the vector set includes: generating matrix groups respectively corresponding to the to-be-processed vectors according to the vector set, the matrix groups including a query matrix, a key matrix, and a value matrix; calculating self-attention vectors respectively corresponding to the to-be-processed vectors according to the matrix groups respectively corresponding to the to-be-processed vectors; calculating feature vectors corresponding to the self-attention vectors according to a feedforward neural network; and calculating a joint semantic vector corresponding to the feature vectors based on a self-attention algorithm and the feedforward neural network.

Based on the above limitation, the step of generating a joint semantic vector according to the vector set may be implemented based on the BERT model. Encoding and decoding modes of a transformer model is used in the BERT model. The transformer model is formed by an encoding component and a decoding component. The encoding component is formed by a plurality of encoders. The decoding component is formed by a plurality of decoders. Quantities of the encoders and the decoders are the same. Each encoder includes a feedforward neural network and a self-attention layer. Each decoder includes a feedforward neural network, an encoding-decoding attention layer, and a self-attention layer.

In some embodiments, a manner of generating matrix groups respectively corresponding to the to-be-processed vectors according to the vector set if multi-head self-attention exists in the self-attention layer may include: generating at least two reference matrix groups corresponding to the to-be-processed vectors; and concatenating the reference matrix groups corresponding to same to-be-processed vectors to obtain the matrix groups corresponding to the to-be-processed vectors. A quantity of the reference matrix groups is the same as a quantity (e.g., 8) of heads of self-attention.

In some embodiments, a manner of generating matrix groups respectively corresponding to the to-be-processed vectors according to the vector set may include: determining a query weight matrix $\omega^Q$, a key weight matrix $\omega^K$, and a value weight matrix $\omega^V$ corresponding to the to-be-processed vectors; multiplying a to-be-processed vector i by $\omega^Q$, $\omega^K$, and $\omega^V$ respectively to obtain a matrix group including a query matrix $Q_i$, a key matrix $K_i$, and a value matrix $V_i$ and corresponding to the to-be-processed vector i; and cyclically performing the above steps until the matrix groups respectively corresponding to all the to-be-processed vectors are determined;

where $i \in [1, 2, \ldots, n]$, and n is a positive integer.

Further, a manner of calculating self-attention vectors respectively corresponding to the to-be-processed vectors according to the matrix groups respectively corresponding to the to-be-processed vectors may include:

calculating a self-attention vector $Z_i$ corresponding to each to-be-processed vector according to the following expression:

$$Z_i = \text{Attention}(Q_i, K_i, V_i) = \text{softmax}\left(\frac{Q_i K_i^T}{\sqrt{d_k}}\right) V_i;$$

where $\sqrt{d_k}$ is used for stabilizing a gradient, and $\sqrt{d_k}$ (e.g., 8) is a constant.

In some embodiments, a manner of calculating feature vectors corresponding to the self-attention vectors according to a feedforward neural network may include:

extracting features of the self-attention vectors according to the following feedforward neural network to obtain the feature vectors corresponding to the self-attention vectors:

$$FFN(Z)=\max(0, ZW_1+b_1)W_2+b_2;$$

where W1, b1, W2, and b2 are adjustable parameters, which may be expressed as constants.

The feedforward neural network includes an activation function layer and a Rectified Linear Unit (ReLU) layer, and is used for normalizing elements in the vector to prevent disappearance of gradients. Specifically, the activation function layer may include a sigmoid function or a tanh function. The ReLU layer may include a relu function.

In some embodiments, a manner of calculating a joint semantic vector corresponding to the feature vectors based on a self-attention algorithm and the feedforward neural network may include: encoding and decoding the above feature vectors multiple times to obtain the joint semantic vector corresponding to the feature vectors by calculation. The encoding and decoding may rely on the self-attention algorithm and the feedforward neural network.

Figure 4:
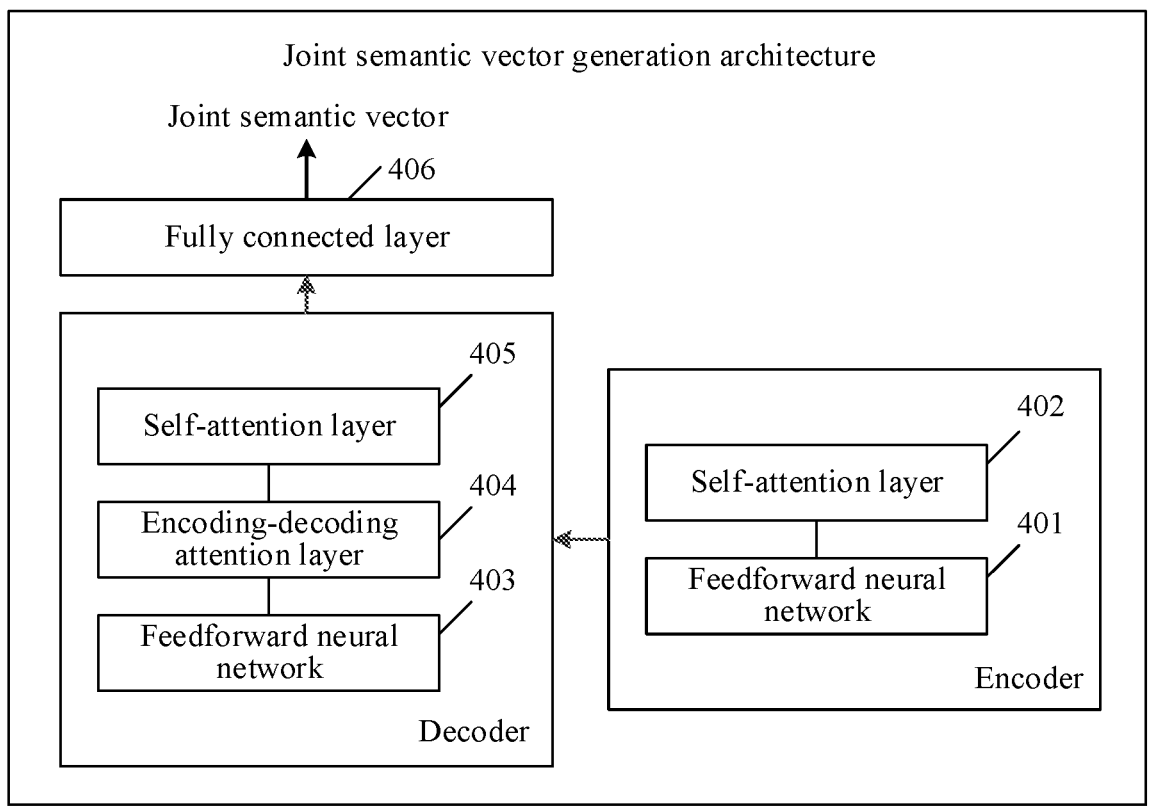
FIG. 4 schematically shows a schematic diagram of a joint semantic vector generation architecture according to an embodiment of the present disclosure.

Referring to FIG. 4, FIG. 4 schematically shows a schematic diagram of a joint semantic vector generation architecture according to an embodiment of the present disclosure. As shown in FIG. 4, the joint semantic vector generation architecture may include an encoder, a decoder, and a fully connected layer 406. The encoder may include a feedforward neural network 401 and a self-attention layer 402. The decoder may include a feedforward neural network 403, an encoding-decoding attention layer 404, and a self-attention layer 405. The encoder and the decoder in FIG. 4 are only schematically shown. During actual application, quantities of the encoder and the decoders are not limited.

Specifically, the self-attention layer 402, after receiving the vector set inputted into the BERT model, may calculate the matrix groups corresponding to the keywords for vectors corresponding to the keywords in the vector set, and calculate self-attention vectors respectively corresponding to the to-be-processed vectors according to the matrix groups as input to the feedforward neural network 401. Then, the feedforward neural network 401 may extract features of the self-attention vectors to obtain the feature vectors corresponding to the self-attention vectors. Further, if the BERT model includes N encoders, N being a positive integer greater than or equal to 2, features of the feature vectors are sequentially encoded by the N encoders. Then, feature encoding results are inputted into the decoder, so that the feedforward neural network 403, the encoding-decoding attention layer 404, and the self-attention layer 405 in the decoder decode the encoding results and input the encoding results into the fully connected layer 406. The fully connected layer 406 may output the joint semantic vector for representing the output probability of each keyword.

Thus, with the implementation of the previously described embodiment, the attribute structure and the conversation information can be combined with multi-type vectors of the keywords, thereby helping to accurately calculate the degree of matching and prevent mismatch between the outputted conversation information and the attribute structure of the target object.

In one embodiment, the generating a joint structure vector according to the attribute structure and the conversation structure includes: representing the attribute structure as a sequence of strings; and calculating the joint structure vector according to the sequence of strings and the semantic relation.

Specifically, strings in the sequence of strings are respectively used for representing node positions of the keywords in the attribute structure. For example, the attribute structure is shown as follows:

| [KV] | | |
|---|---|---|
| Gender | Location | Constellation |
| Female | City A | Aquarius |

The sequence of strings corresponding to the attribute structure including keywords {[KV], Gender, female, Location, City A, Constellation, Aquarius} may be {0 1 2 1 4 1 6}. [KV] may correspond to a parent node 0, [KV] is used for representing the target object. Gender, Location, and Constellation may correspond to a child node 1, and female, City A, and Aquarius may sequentially correspond to child nodes 2, 4, and 6.

Thus, with the implementation of the previously described embodiment, the attribute keywords and the conversation keywords can be combined to calculate the degree of matching to determine required vectors, thereby helping to improve accuracy of the determination of the degree of matching.

In one embodiment, the calculating the joint structure vector according to the sequence of strings and the semantic relation includes: calculating a first reference vector corresponding to the attribute structure based on a recurrent neural network and the sequence of strings; calculating a second reference vector corresponding to the conversation structure based on the recurrent neural network and the semantic relation; and concatenating the first reference vector and the second reference vector to obtain the joint structure vector.

Specifically, the recurrent neural network may be a Tree LSTM. Each unit in the Tree LSTM includes an input gate, an output gate, a unit state, and hidden layer output. Update of a gate vector and a cell state in a Tree LSTM unit depends on a state of all subunits associated therewith. In addition, the Tree LSTM includes a plurality of forget gates respectively corresponding to the subunits in a current unit. The Tree LSTM may selectively acquire information from child nodes. In addition, the first reference vector is a vectorized representation of the attribute structure, and the second reference vector is a vectorized representation of the conversation structure.

In some embodiments, a manner of calculating a first reference vector corresponding to the attribute structure based on a recurrent neural network and the sequence of strings may include: determining attribute keyword vectors corresponding to attribute keywords that constitute the attribute structure; and inputting the attribute keyword vectors including the sequence of strings into the recurrent neural network, so that the recurrent neural network constructs a keyword node tree according to the sequence of strings and calculates the first reference vector corresponding to the attribute structure according to the keyword node tree.

Specifically, each node in the keyword node tree can be calculated according to the following expressions:

$$\text{Input gate } i_j=\sigma(W^{(i)}x_j+U^{(i)}\hat{h}_j+b^{(i)});$$

$$\text{Forget gate } f_{jk}=\sigma(W^{(f)}x_j+U^{(f)}h_k+b^{(f)});$$

$$\text{Output gate } o_j=\sigma(W^{(o)}x_j+U^{(o)}\hat{h}_j+b^{(o)});$$

Then, the following expression can be obtained:

$$C_j = i_j \odot u_j + \Sigma_{k \in C(j)} f_{jk} \odot c_k;$$

where $u_j = \tanh(W^{(u)} x_j + U^{(u)} \hat{h}_j + b^{(u)})$;

$C_j$ denotes a set of child nodes of a node j in the keyword node tree.

A hidden state $h_j = o_j \odot \tanh(C_j)$; may be calculated according to $C_j$.

Then, the first reference vector $\hat{h}_j = \Sigma_{k \in C(j)} h_k$, may be calculated according to $h_j$.

Similarly, a manner of calculating a second reference vector corresponding to the conversation structure based on the recurrent neural network and the semantic relation may include: determining conversation keyword vectors corresponding to conversation keywords that constitute the conversation structure; and inputting the conversation keyword vectors including the semantic relation into the recurrent neural network, so that the recurrent neural network constructs a keyword node tree according to the semantic relation and calculates the second reference vector corresponding to the conversation structure according to the keyword node tree.

Thus, with the implementation of the previously described embodiment, the vectorized representations of the conversation structure and the attribute structure can be realized to use the structure vectors as conditions for calculating the degree of matching, thereby improving accuracy of the calculation of the degree of matching.

In step S350, the degree of matching between the target object and the conversation information is determined according to the joint semantic vector and the joint structure vector, and the conversation information is outputted in response to the degree of matching meeting the preset condition.

Specifically, the preset condition may be expressed as a value range or as a limitation on labels/categories, which is not limited in the embodiment of the present disclosure. For example, the preset condition may be the degree of matching being greater than 80%. Alternatively, the degree of matching is represented as text information being "consistent" (e.g., "entailed"). In addition, if the degree of matching does not meet the preset condition, the following step may also be performed: discarding the conversation information.

In some embodiments, the outputting the conversation information in response to the degree of matching meeting a preset condition specifically includes: adding the conversation information to a list of qualified information in response to the degree of matching meeting the preset condition; and selecting target conversation information from the list of qualified information and outputting the target conversation information when it is detected that the calculation of the degree of matching is completed for all to-be-outputted conversation information generated per unit time. The list of qualified information may include one or more pieces of conversation information. Degrees of matching corresponding to the conversation information in the list of qualified information all meet the preset condition.

Further, a manner of selecting target conversation information from the list of qualified information if the degree of matching is expressed by a value (e.g., 80%) may include: selecting first N pieces of conversation information with the highest degree of matching from the list of qualified information as the target conversation information; where N is a positive integer. The manner of selecting target conversation information from the list of qualified information if the degree of matching is expressed by a label or category may include: selecting at least one piece of conversation information from the list of qualified information as the target conversation information.

In one embodiment, the determining a degree of matching between the target object and the conversation information according to the joint semantic vector and the joint structure vector includes: concatenating the joint semantic vector and the joint structure vector to obtain an integrated vector; performing dimension reduction on the integrated vector, and calculating probabilities of a dimension reduction result belonging to preset categories; and representing the degree of matching by the preset category corresponding to the highest probability.

Specifically, the preset categories may be: Entailed, Contradicted, or Irrelevant. "Entailed" means that the conversation information includes attribute information and does not include facts that contradict the attribute information. "Contradicted" means that the conversation information includes the attribute information and includes the facts that contradict the attribute information. "Irrelevant" means that the conversation information does not include the attribute information.

In some embodiments, a manner of concatenating the joint semantic vector and the joint structure vector to obtain an integrated vector may include: concatenating an N1-dimensional joint semantic vector and an N2-dimensional joint structure vector to obtain an (N1+N2)-dimensional integrated vector. N1 and N2 are positive integers. N1 and N2 may be the same or different.

In some embodiments, a manner of performing dimension reduction on the integrated vector, and calculating probabilities of a dimension reduction result belonging to preset categories may include: mapping the integrated vector to a low-dimensional integrated vector by the fully connected layer, where a quantity (e.g., 3) of elements in the low-dimensional integrated vector is consistent with a quantity (e.g., 3) of the preset categories to achieve dimension reduction on the integrated vector; and transforming the elements in the low-dimensional integrated vector into probability representations by a softmax logistic regression model, the probability representations one-to-one corresponding to the preset categories, and the probability representations being used for representing possibilities of the conversation information belonging to the preset categories. A quantity (e.g., 4096) of neurons included in the fully connected layer is not limited in the embodiment of the present disclosure.

Thus, with the implementation of the previously described embodiment, the degree of matching between the target object and the conversation information can be determined in conjunction with semantics and information structures, accuracy of the calculation of the degree of matching can be improved, inconsistency between the target object and the outputted conversation information can be prevented to some extent, and the target object perceived by the user can be more vivid.

Figure 5:
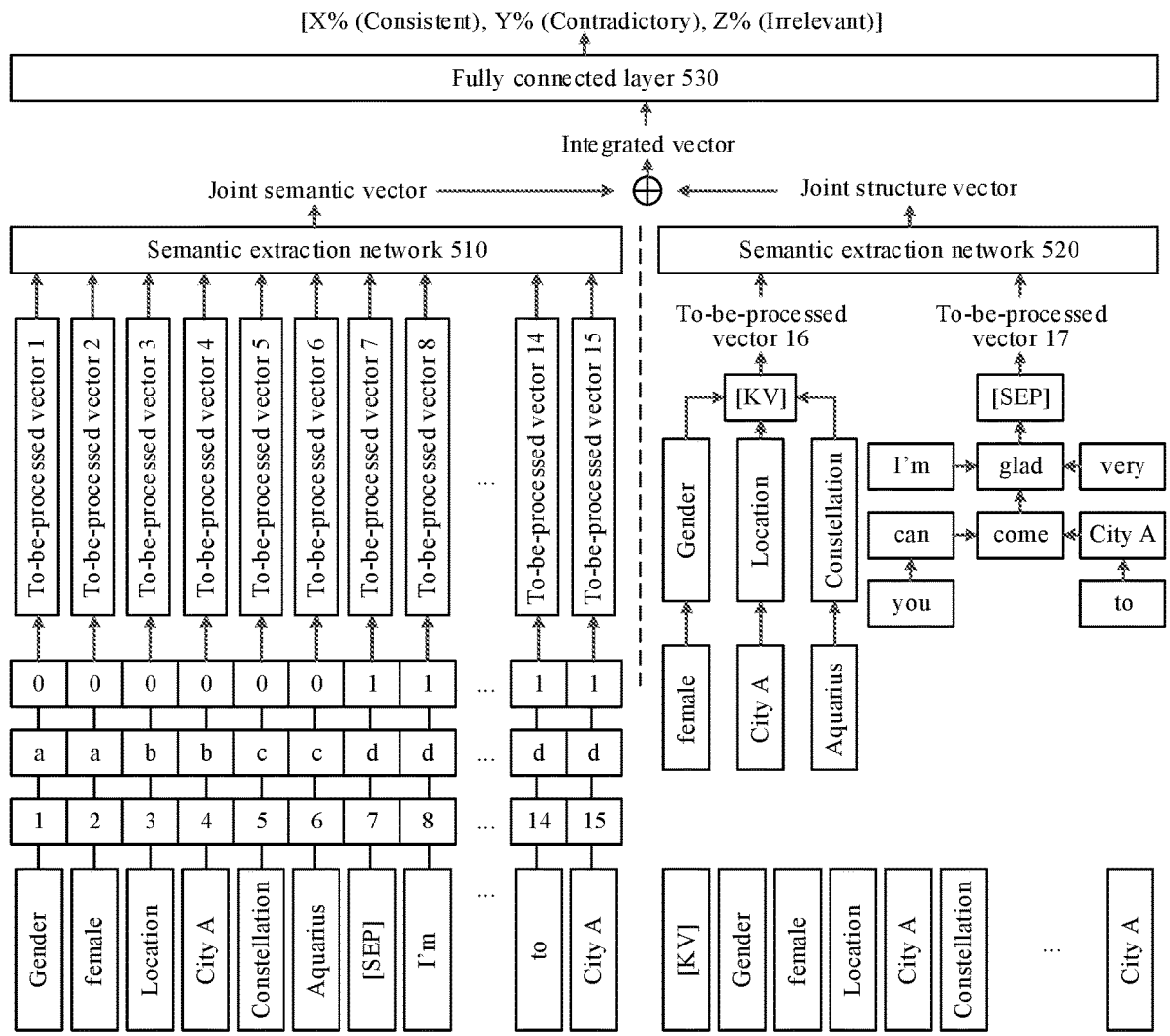
FIG. 5 schematically shows a schematic diagram of a framework of a conversation information processing system according to an embodiment of the present disclosure.

Referring to FIG. 5, FIG. 5 schematically shows a schematic diagram of a framework of a conversation information processing system according to an embodiment of the present disclosure. As shown in FIG. 5, the conversation information processing system may include: a semantic extraction network 510, a semantic extraction network 520, and a fully connected layer. Specifically, when it is detected that a new chat message "Little H, I'm coming to City A" is displayed in the conversation window, to-be-outputted conversation information "I'm very glad you can come to City A" corresponding to the new chat message is determined.

Then, an attribute structure {Gender: female, Age: 16, Location: City A, Constellation: Aries} corresponding to the target object Little H may be read, and the conversation information is structured to obtain a conversation structure {I'm, very, glad, you, can, come, to, City A}.

Then, keyword vectors of the keywords in the keyword set {Gender, female, Location, Beijing, Constellation, Leo, [SEP], I'm, very, glad, you, can, come, to, City A} formed by the keywords in the attribute structure and the keywords in the conversation structure may be determined according to a preset vector relation. Position vectors corresponding to the keywords are determined according to position information {1, 2, 3, 4, 5, 6, 7, 8, . . . , 14, 15} of the keywords. Category vectors {aa, bb, cc, dd, . . . , dd} of the keywords are determined according to categories respectively corresponding to the keywords. Separation vectors {0, 0, 0, 0, 0, 0, 1, 1, . . . , 1, 1} of the keywords are determined according to the attribute structure and the conversation structure.

Then, para addition may be performed on the keyword vectors, the position vectors, the category vectors, and the separation vectors corresponding to same keywords to obtain to-be-processed vectors respectively corresponding to the keywords. A set of the to-be-processed vectors respectively corresponding to the keywords is determined to be a vector set. The vector set includes: a to-be-processed vector 1, a to-be-processed vector 2, a to-be-processed vector 3, a to-be-processed vector 4, a to-be-processed vector 5, a to-be-processed vector 6, a to-be-processed vector 7, a to-be-processed vector 8, . . . , a to-be-processed vector 14, and a to-be-processed vector 15. Then, the vector set may be inputted into the semantic extraction network 510, so that the semantic extraction network 510 can calculate the joint semantic vector based on a self-attention algorithm and the feedforward neural network. Moreover, the attribute structure including the attribute keywords {[KV], Gender, female, Location, City A, Constellation, Aquarius} and the conversation structure including the conversation keywords {[SEP], I'm, very, glad, you, can, come, to, City A} and the semantic relation may also be respectively inputted into the semantic extraction network 520 in the form of a to-be-processed vector 16 and a to-be-processed vector 17, so that the semantic extraction network 520 can calculate the joint structure vector for vector representations of the attribute structure and the conversation structure. The to-be-processed vector 16 may include an attribute keyword vector, and the to-be-processed vector 17 may include a conversation keyword vector.

Then, the joint semantic vector and the joint structure vector may be concatenated to obtain an integrated vector, dimension reduction is performed on the integrated vector by the fully connected layer 530, and probabilities of the dimension reduction result belonging to preset categories [X % (Entailed), Y % (Contradicted), Z % (Irrelevant)] are calculated. The preset category corresponding to the highest probability may be used for representing the degree of matching between the target object and the conversation information.

Figure 6:
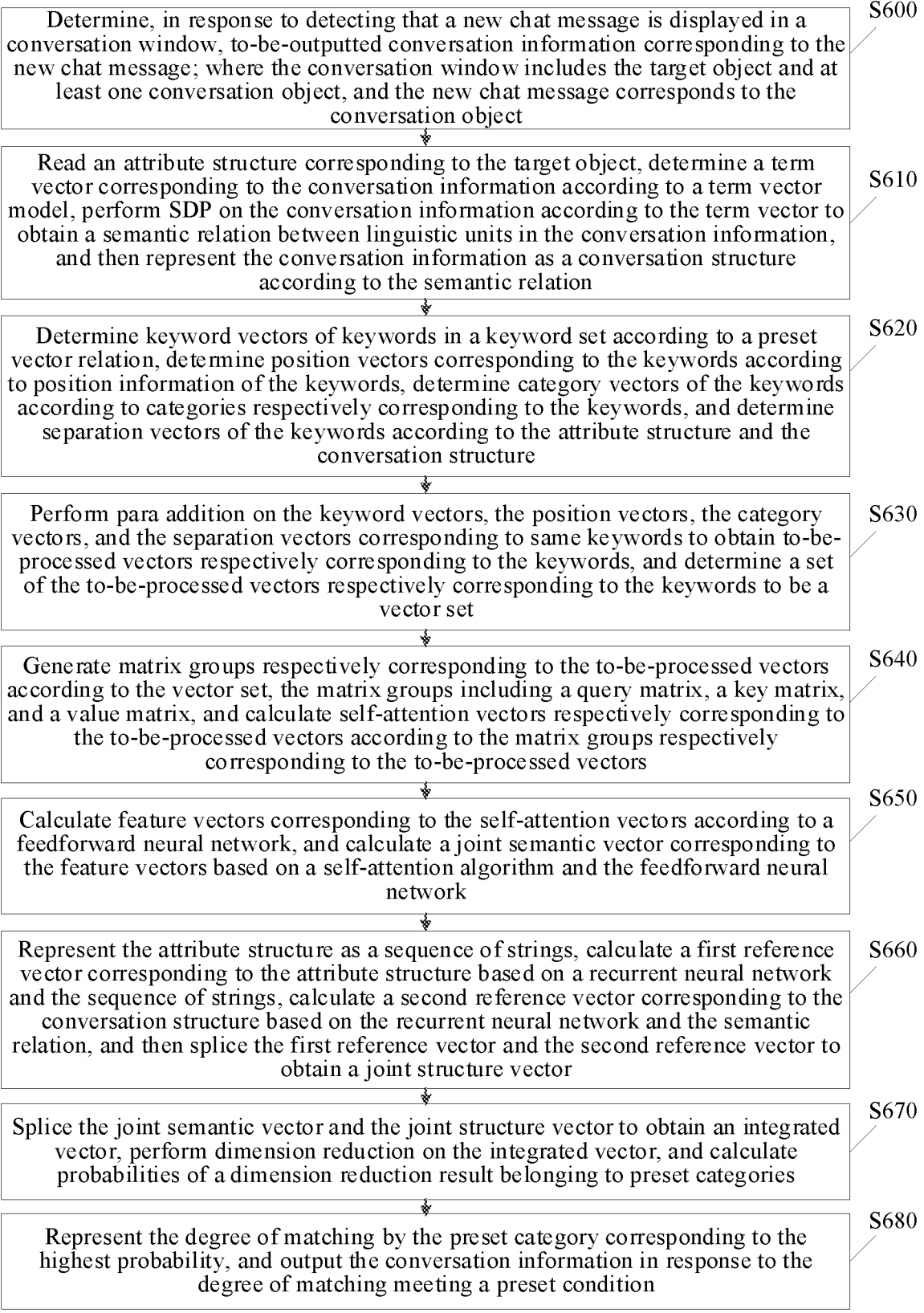
FIG. 6 schematically shows a flowchart of a conversation information processing method according to an embodiment of the present disclosure.

Referring to FIG. 6, FIG. 6 schematically shows a flowchart of a conversation information processing method according to an embodiment of the present disclosure. As shown in FIG. 6, the conversation information processing method may include steps S600 to S680.

Step S600: Determine, in response to detecting that a new chat message is displayed in a conversation window, to-be-outputted conversation information corresponding to the new chat message; where the conversation window includes the target object and at least one conversation object, and the new chat message corresponds to the conversation object.

Step S610: Read an attribute structure corresponding to the target object, determine a term vector corresponding to the conversation information according to a term vector model, perform SDP on the conversation information according to the term vector to obtain a semantic relation between linguistic units in the conversation information, and then represent the conversation information as a conversation structure according to the semantic relation.

Step S620: Determine keyword vectors of keywords in a keyword set according to a preset vector relation, determine position vectors corresponding to the keywords according to position information of the keywords, determine category vectors of the keywords according to categories respectively corresponding to the keywords, and determine separation vectors of the keywords according to the attribute structure and the conversation structure.

Step S630: Perform para addition on the keyword vectors, the position vectors, the category vectors, and the separation vectors corresponding to same keywords to obtain to-be-processed vectors respectively corresponding to the keywords, and determine a set of the to-be-processed vectors respectively corresponding to the keywords to be a vector set.

Step S640: Generate matrix groups respectively corresponding to the to-be-processed vectors according to the vector set, the matrix groups including a query matrix, a key matrix, and a value matrix, and calculate self-attention vectors respectively corresponding to the to-be-processed vectors according to the matrix groups respectively corresponding to the to-be-processed vectors.

Step S650: Calculate feature vectors corresponding to the self-attention vectors according to a feedforward neural network, and calculate a joint semantic vector corresponding to the feature vectors based on a self-attention algorithm and the feedforward neural network.

Step S660: Represent the attribute structure as a sequence of strings, calculate a first reference vector corresponding to the attribute structure based on a recurrent neural network and the sequence of strings, calculate a second reference vector corresponding to the conversation structure based on the recurrent neural network and the semantic relation, and then concatenate the first reference vector and the second reference vector to obtain a joint structure vector.

Step S670: Concatenate the joint semantic vector and the joint structure vector to obtain an integrated vector, perform dimension reduction on the integrated vector, and calculate probabilities of a dimension reduction result belonging to preset categories.

Step S680: Represent the degree of matching by the preset category corresponding to the highest probability, and output the conversation information in response to the degree of matching meeting a preset condition.

Steps S600 to S680 correspond to the steps and the embodiments shown in FIG. 3. Please refer to the steps and the embodiments shown in FIG. 3 for embodiments of steps S600 to S680. Details are not described herein.

Thus, with the implementation of the method shown in FIG. 6, accuracy of the calculated degree of matching between the conversation information and the target object can be improved, so that the conversation information can be outputted when the degree of matching meets the preset condition, and the conversation information returned by the target object matches the attribute structure of the target object. In addition, consistency between the target object and the outputted conversation information can also be improved, and authenticity of the target object can be improved.

Figure 7:
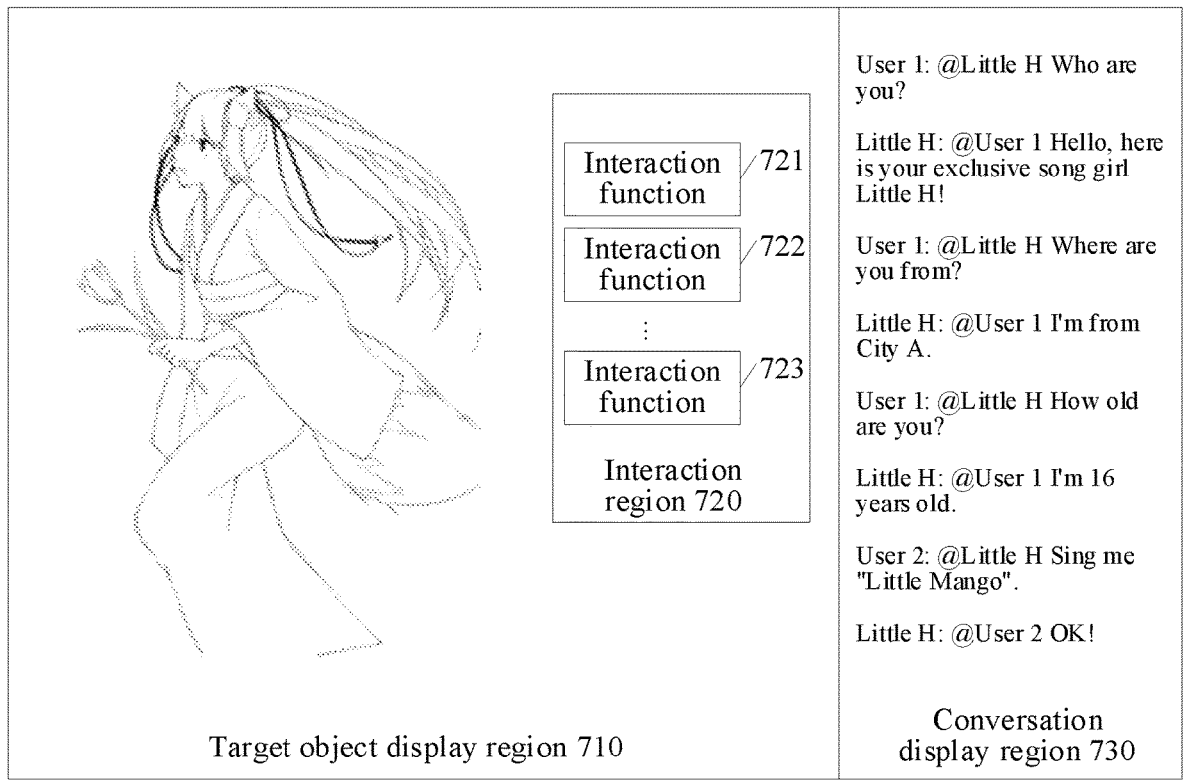
FIG. 7 schematically shows a schematic diagram of a user interface for displaying conversation information according to an embodiment of the present disclosure.

Referring to FIG. 7, FIG. 7 schematically shows a schematic diagram of a user interface for displaying conversation information according to an embodiment of the present disclosure. As shown in FIG. 7, a display interface for a user may include a target object display region 710, an interaction region 720, and a conversation display region 730. The interaction region 720 may include: an interaction function 721, an interaction function 722, . . . , and an interaction function 723. The interaction function may include a song requesting function, a gift sending function, an evaluation function, and the like. The conversation display region 730 may be on a right or left side of the target object display region 710, so that the user can view conversation content synchronously when viewing dynamic display of a target object.

Figure 8:
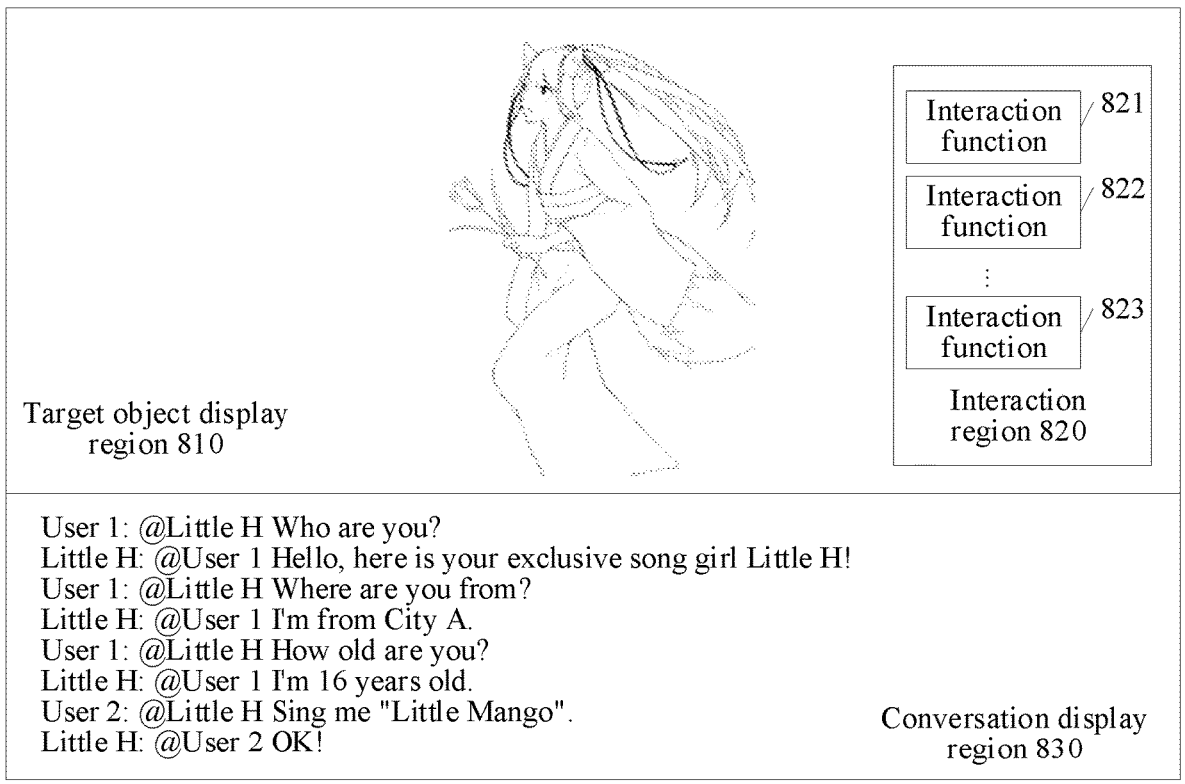
FIG. 8 schematically shows a schematic diagram of a user interface for displaying conversation information according to an embodiment of the present disclosure.
Figure 9:
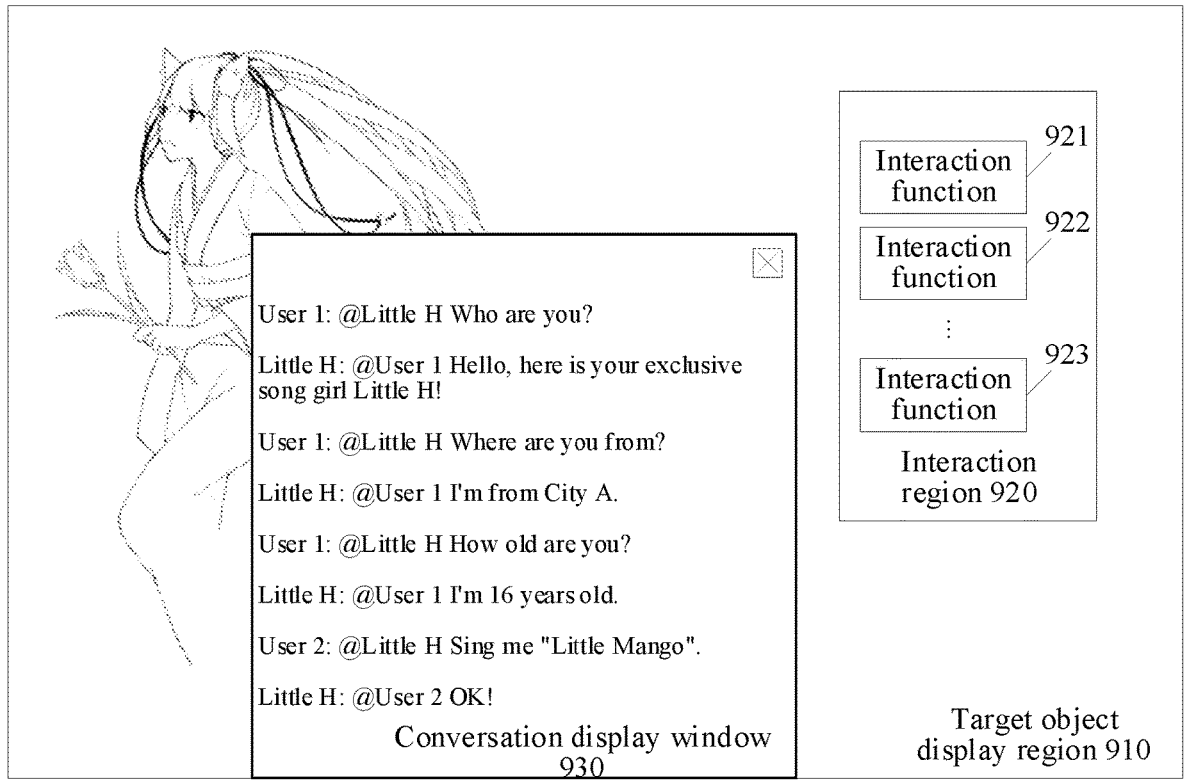
FIG. 9 schematically shows a schematic diagram of a user interface for displaying conversation information according to an embodiment of the present disclosure.

FIG. 7 to FIG. 9 display content of a multi-party conversation among a user 1, a user 2, and Little H, as shown below.

User 1: @Little H Who are you? Little H: @User 1 Hello, here is your exclusive song girl Little H! User 1: @Little H Where are you from? Little H: @User 1 I'm from City A. User 1: @Little H How old are you? Little H: @User 1 I'm 16 years old. User 2: @Little H Sing me "Little Mango". Little H: @User 2 OK!

Thus, Little H can reply correspondingly according to chat messages of different users to keep reply content matching Little H's attributes.

Referring to FIG. 8, FIG. 8 schematically shows a schematic diagram of a user interface for displaying conversation information according to an embodiment of the present disclosure. As shown in FIG. 8, a display interface for a user may include a target object display region 810, an interaction region 820, and a conversation display region 830. The interaction region 820 may include: an interaction function 821, an interaction function 822, . . . , and an interaction function 823. The interaction function may include a song requesting function, a gift sending function, an evaluation function, and the like. The conversation display region 830 may be on an upper or lower side of the target object display region 810, so that the user can view conversation content synchronously when viewing dynamic display of a target object.

Referring to FIG. 9, FIG. 9 schematically shows a schematic diagram of a user interface for displaying conversation information according to an embodiment of the present disclosure. As shown in FIG. 9, a display interface for a user may include a target object display region 910, an interaction region 920, and a conversation display window 930. The interaction region 920 may include: an interaction function 921, an interaction function 922, . . . , and an interaction function 923. The interaction function may include a song requesting function, a gift sending function, an evaluation function, and the like. In FIG. 9, the conversation display window 930 may cover part of the target object display region 910 in the form of a pop-up window. The user can trigger the conversation display window 930 to pop up by an operation such as a gesture, a click, or voice wake-up when needing to view the conversation display window 930, and can close the conversation display window 930 by closing a window control when not needing to view the conversation display window 930, so as to realize full-screen viewing of the target object. FIG. 7 to FIG. 9 provide three different display manners.

Although each step of the flowcharts in FIG. 3 and FIG. 6 is shown sequentially according to arrows, the steps are not necessarily performed according to an order indicated by arrows. Unless clearly specified in this specification, there is no strict sequence limitation on the execution of the steps, and the steps may be performed in another sequence. In addition, at least some steps in FIG. 3 and FIG. 6 may include a plurality of steps or a plurality of stages. The steps or the stages are not necessarily performed at the same moment, and instead may be performed at different moments. The steps or the stages are not necessarily performed sequentially, and instead may be performed in turn or alternately with another step or at least some of steps or stages of the another step.

Figure 10:
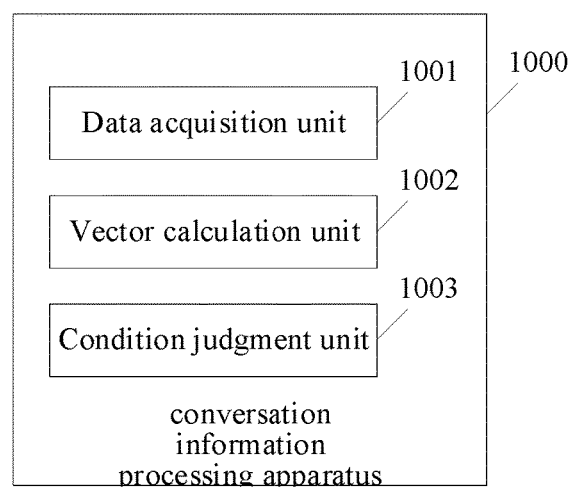
FIG. 10 schematically shows a structural block diagram of a conversation information processing apparatus according to an embodiment of the present disclosure.

Further, in the exemplary embodiment, a conversation information processing apparatus is further provided. Referring to FIG. 10, the conversation information processing apparatus, 1000 may include: a data acquisition unit 1001, a vector calculation unit 1002, and a condition judgment unit 1003.

The data acquisition unit 1001 is configured to acquire an attribute structure and a conversation structure that correspond to a target object in response to detecting conversation information to be output; the conversation structure being used for representing the conversation information.

The vector calculation unit 1002 is configured to calculate a vector set corresponding to a keyword set; the keyword set including keywords in the attribute structure and keywords in the conversation structure.

The vector calculation unit 1002 is further configured to generate a joint semantic vector according to the vector set, and generate a joint structure vector according to the attribute structure and the conversation structure.

The condition judgment unit 1003 is configured to determine a degree of matching between the target object and the conversation information according to the joint semantic vector and the joint structure vector, and output the conversation information in response to the degree of matching meeting a preset condition.

Thus, with the implementation of the apparatus shown in FIG. 10, accuracy of the calculated degree of matching between the conversation information and the target object can be improved, so that the conversation information can be outputted when the degree of matching meets the preset condition, and the conversation information returned by the target object matches the attribute structure of the target object. In addition, consistency between the target object and the outputted conversation information can also be improved, and authenticity of the target object can be improved.

In an exemplary embodiment of the present disclosure, the apparatus further includes: an information determination unit (not shown).

The information determination unit is configured to, before the data acquisition unit 1001 acquires an attribute structure and a conversation structure that correspond to a target object, determine, in response to detecting that a new chat message is displayed in a conversation window, the conversation information corresponding to the new chat message;

where the conversation window includes the target object and at least one conversation object, and the new chat message corresponds to the conversation object.

Thus, with the implementation of the previously described embodiment, when a chat message corresponding to the target object and entered by the user is detected, the chat message can be responded according to attributes of the target object, which provides a chat function to meet the user's instant chat need.

In an exemplary embodiment of the present disclosure, the determining, by the information determination unit, the conversation information corresponding to the new chat message includes:

selecting the conversation information from a preset information base according to the new chat message;

or generating the conversation information according to the new chat message.

Thus, with the implementation of the previously described embodiment, corresponding conversation information can be determined according to content of the new chat message entered by the user. In this way, the user's chat experience can be improved, and an irrelevant answer is prevented to some extent.

In an exemplary embodiment of the present disclosure, the acquiring, by the data acquisition unit 1001, an attribute structure and a conversation structure that correspond to a target object includes:

reading the attribute structure corresponding to the target object; and structuring the conversation information to obtain the conversation structure.

Thus, with the implementation of the previously described embodiment, the attribute structure and the conversation structure of the target object can be determined, thereby helping to determine the degree of matching between the target object and the conversation information according to the attribute structure and the conversation structure to prevent mismatch between the outputted conversation information and the target object.

In an exemplary embodiment of the present disclosure, the structuring, by the data acquisition unit 1001, the conversation information to obtain the conversation structure includes:

determining a term vector corresponding to the conversation information according to a term vector model;

performing text structure parsing on the conversation information according to the term vector to obtain a semantic relation between linguistic units in the conversation information; and representing the conversation information as the conversation structure according to the semantic relation.

Thus, with the implementation of the previously described embodiment, the conversation information can be structured by semantically parsing the conversation information, thereby helping to determine the degree of matching between the target object and the conversation information.

In an exemplary embodiment of the present disclosure, the structuring, by the data acquisition unit 1001, the conversation information to obtain the conversation structure includes:

comparing the conversation information with a preset word set to determine keywords in the conversation information; and constructing a conversation structure including the keywords in the conversation information according to a preset word relation.

Thus, with the implementation of the previously described embodiment, the conversation structure corresponding to the conversation information can be determined according to preset information, so that the degree of matching can be jointly determined based on the conversation structure and the attribute structure to improve accuracy of the calculation of the degree of matching.

In an exemplary embodiment of the present disclosure, the calculating, by the vector calculation unit 1002, a vector set corresponding to a keyword set includes:

determining keyword vectors of keywords in the keyword set according to a preset vector relation;

determining position vectors corresponding to the keywords according to position information of the keywords;

determining category vectors of the keywords according to categories respectively corresponding to the keywords;

determining separation vectors of the keywords according to the attribute structure and the conversation structure; where the separation vectors of the keywords in the attribute structure are the same, and the separation vectors of the keywords in the conversation structure are the same;

performing para addition on the keyword vectors, the position vectors, the category vectors, and the separation vectors corresponding to same keywords to obtain to-be-processed vectors respectively corresponding to the keywords; and determining a set of the to-be-processed vectors respectively corresponding to the keywords to be the vector set.

Thus, with the implementation of the previously described embodiment, different types of vectors corresponding to the keywords can be calculated, and the vectors are fused to obtain to-be-processed vectors corresponding to the keywords, so as to calculate the degree of matching between the target object and the conversation information according to a set of the to-be-processed vectors to improve accuracy of the calculation of the degree of matching.

In an exemplary embodiment of the present disclosure, the apparatus further includes: a keyword concatenating unit and a position annotation unit (not shown).

The keyword concatenating unit is configured to, before the vector calculation unit 1002 determines position vectors corresponding to the keywords according to position information of the keywords, concatenate the keywords in the attribute structure and the keywords in the conversation structure.

The position annotation unit is configured to sequentially annotate position information for the keywords in the keyword set according to a keyword sorting order of concatenating results to obtain the position information of the keywords.

Thus, with the implementation of the previously described embodiment, the position information of the keywords can be annotated, thereby helping to calculate position vectors of the keywords to improve accuracy of subsequent calculation of the degree of matching.

In an exemplary embodiment of the present disclosure, the generating, by the vector calculation unit 1002, a joint semantic vector according to the vector set includes:

generating matrix groups respectively corresponding to the to-be-processed vectors according to the vector set, the matrix groups including a query matrix, a key matrix, and a value matrix;

calculating self-attention vectors respectively corresponding to the to-be-processed vectors according to the matrix groups respectively corresponding to the to-be-processed vectors;

calculating feature vectors corresponding to the self-attention vectors according to a feedforward neural network; and calculating a joint semantic vector corresponding to the feature vectors based on a self-attention algorithm and the feedforward neural network.

Thus, with the implementation of the previously described embodiment, the attribute structure and the information can be combined with multi-type vectors of the keywords, thereby helping to accurately calculate the degree of matching and prevent mismatch between the outputted conversation information and the attribute structure of the target object.

In an exemplary embodiment of the present disclosure, the generating, by the vector calculation unit 1002, a joint structure vector according to the attribute structure and the conversation structure includes:

representing the attribute structure as a sequence of strings; and calculating the joint structure vector according to the sequence of strings and the semantic relation.

Thus, with the implementation of the previously described embodiment, the attribute keywords and the conversation keywords can be combined to calculate the degree of matching to determine required vectors, thereby helping to improve accuracy of the determination of the degree of matching.

In an exemplary embodiment of the present disclosure, the calculating, by the vector calculation unit 1002, the joint structure vector according to the sequence of strings and the semantic relation includes:

calculating a first reference vector corresponding to the attribute structure based on a recurrent neural network and the sequence of strings;

calculating a second reference vector corresponding to the conversation structure based on the recurrent neural network and the semantic relation; and concatenating the first reference vector and the second reference vector to obtain the joint structure vector.

Thus, with the implementation of the previously described embodiment, the vectorized representations of the conversation structure and the attribute structure can be realized to use the structure vectors as conditions for calculating the degree of matching, thereby improving accuracy of the calculation of the degree of matching.

In an exemplary embodiment of the present disclosure, the determining, by the condition judgment unit 1003, a degree of matching between the target object and the conversation information according to the joint semantic vector and the joint structure vector includes:

concatenating the joint semantic vector and the joint structure vector to obtain an integrated vector;

performing dimension reduction on the integrated vector, and calculating probabilities of a dimension reduction result belonging to preset categories; and representing the degree of matching by the preset category corresponding to the highest probability.

Thus, with the implementation of the previously described embodiment, the degree of matching between the target object and the conversation information can be determined in conjunction with semantics and information structures, accuracy of the calculation of the degree of matching can be improved, inconsistency between the target object and the outputted conversation information can be prevented to some extent, and the target object perceived by the user can be more vivid.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

Although several modules or units of a device for action execution are mentioned in the foregoing detailed descriptions, the division is not mandatory. Actually, according to the implementations of the present disclosure, the features and functions of two or more modules or units described above may be specified in one module or unit. Conversely, features and functions of one module or unit described above may be further divided into a plurality of modules or units for implementation.

Since the functional modules of the conversation information processing apparatus in the exemplary embodiment of the present disclosure correspond to the steps in the exemplary embodiment of the conversation information processing method, for details not disclosed in the apparatus embodiment of the present disclosure, refer to the embodiment of the conversation information processing method of the present disclosure.

In another aspect, the present disclosure further provides a computer readable medium. The computer readable medium may be included in the electronic device described in the above embodiments, or may exist alone without being assembled into the electronic device. The computer-readable medium carries one or more programs, the one or more programs, when executed by the electronic device, causing the electronic device to implement the method described in the foregoing embodiments.

The computer-readable medium shown in the present disclosure may be a computer-readable signal medium or a computer-readable storage medium or any combination thereof. The computer-readable storage medium may be, for example, but is not limited to, an electric, magnetic, optical, electromagnetic, infrared, or semi-conductive system, apparatus, or component, or any combination thereof. More specifically, the computer-readable storage medium may include, for example, but is not limited to, an electrical connection having one or more wires, a portable computer disk, a hard disk, a RAM, a ROM, an erasable programmable read-only memory (EPROM or flash memory), an optical fiber, a portable compact disc read-only memory (CD-ROM), an optical storage device, a magnetic storage device, or any suitable combination of the foregoing. In the present disclosure, the computer-readable storage medium may be any tangible medium including or storing a program, and the program may be used by or in combination with an instruction execution system, apparatus, or device. In the present disclosure, a computer-readable signal medium may include a data signal being in a baseband or propagated as a part of a carrier wave, the data signal carrying computer-readable program code. The data signal propagated in such a way may assume a plurality of forms, including, but not limited to, an electromagnetic signal, an optical signal, or any appropriate combination thereof. The computer-readable signal medium may be further any computer readable medium in addition to a computer-readable storage medium. The computer readable medium may send, propagate, or transmit a program that is used by or used in conjunction with an instruction execution system, an apparatus, or a device. The program code contained in the computer readable medium may be transmitted by using any appropriate medium, including but not limited to: a wireless medium, a wire, an optical cable, RF, any suitable combination thereof, or the like.

The flowcharts and block diagrams in the accompanying drawings illustrate possible system architectures, functions, and operations that may be implemented by a system, a method, and a computer program product according to various embodiments of the present disclosure. In this regard, each box in the flowchart or the block diagram may represent a module, a program segment, or a part of code. The module, the program segment, or the part of code includes one or more executable instructions used for implementing specified logic functions. In some alternative implementations, functions annotated in the blocks may alternatively occur in a sequence different from that annotated in the accompanying drawings. For example, actually, two blocks shown in succession may be performed basically concurrently, and sometimes, the two blocks may alternatively be performed in a reverse sequence. This is determined by related functions. Each block in the block diagram or the flowchart, and a combination of blocks in the block diagram or the flowchart may be implemented by using a dedicated hardware-based system that performs a specified function or operation, or may be implemented by using a combination of dedicated hardware and computer instructions.

Related units described in the embodiments of the present disclosure may be implemented in a software manner, or may be implemented in a hardware manner, and the unit described can also be set in a processor. Names of the units do not constitute a limitation on the units in a specific case.

Other embodiments of the present disclosure will be apparent to a person skilled in the art from consideration of the specification and practice of the disclosure here. The present disclosure is intended to cover any variations, uses, or adaptive changes of the present disclosure following the general principles of the present disclosure, and includes well-known knowledge and existing technical means in the art and undisclosed in the present disclosure. The specification and the embodiments are considered as merely exemplary, and the real scope and spirit of the present disclosure are pointed out in the following claims.

It is to be understood that the present disclosure is not limited to the precise structures described above and shown in the accompanying drawings, and various modifications and changes may be made without departing from the scope of the present disclosure. The scope of the present disclosure is subject only to the appended claims.

What is claimed is:

1. A conversation information processing method, performed by an electronic device, the method comprising:
   acquiring an attribute structure and a conversation structure that correspond to a target object in response to detecting conversation information to be output; the conversation structure being used for representing the conversation information;
   calculating a vector set corresponding to a keyword set; the keyword set comprising keywords in the attribute structure and keywords in the conversation structure;
   generating a joint semantic vector according to the vector set;
   generating a joint structure vector according to the attribute structure and the conversation structure; and
   determining a degree of matching between the target object and the conversation information according to the joint semantic vector and the joint structure vector, and outputting the conversation information in response to the degree of matching meeting a preset condition.

2. The method according to claim 1, wherein prior to the acquiring an attribute structure and a conversation structure that correspond to a target object, the method further comprises:
   determining, in response to detecting that a new chat message is displayed in a conversation window, the conversation information corresponding to the new chat message;
   wherein the conversation window comprises the target object and at least one conversation object, and the new chat message corresponds to the conversation object.

3. The method according to claim 2, wherein the determining the conversation information corresponding to the new chat message comprises:
   selecting the conversation information from a preset information base according to the new chat message; or generating the conversation information according to the new chat message.

4. The method according to claim 1, wherein the determining a degree of matching between the target object and the conversation information according to the joint semantic vector and the joint structure vector comprises:
   concatenating the joint semantic vector and the joint structure vector to obtain an integrated vector;
   performing dimension reduction on the integrated vector to obtain a dimension reduction result;
   calculating probabilities of the dimension reduction result belonging to preset categories; and
   representing the degree of matching by the preset category corresponding to the highest probability.

5. The method according to claim 1, wherein the acquiring an attribute structure and a conversation structure that correspond to a target object comprises:
   reading the attribute structure corresponding to the target object; and
   structuring the conversation information to obtain the conversation structure.

6. The method according to claim 5, wherein the structuring the conversation information to obtain the conversation structure comprises:
   comparing the conversation information with a preset word set to determine keywords in the conversation information; and
   constructing a conversation structure comprising the keywords in the conversation information according to a preset word relation.

7. The method according to claim 5, wherein the structuring the conversation information to obtain the conversation structure comprises:
   determining a term vector corresponding to the conversation information according to a term vector model;
   performing text structure parsing on the conversation information according to the term vector to obtain a semantic relation between linguistic units in the conversation information; and
   representing the conversation information as the conversation structure according to the semantic relation.

8. The method according to claim 7, wherein the generating a joint structure vector according to the attribute structure and the conversation structure comprises:
   representing the attribute structure as a sequence of strings; and
   calculating the joint structure vector according to the sequence of strings and the semantic relation.

9. The method according to claim 8, wherein the calculating the joint structure vector according to the sequence of strings and the semantic relation comprises:
calculating a first reference vector corresponding to the attribute structure based on a recurrent neural network and the sequence of strings;
calculating a second reference vector corresponding to the conversation structure based on the recurrent neural network and the semantic relation; and
concatenating the first reference vector and the second reference vector to obtain the joint structure vector.

10. The method according to claim 1, wherein the calculating a vector set corresponding to a keyword set comprises:
determining keyword vectors of keywords in the keyword set according to a preset vector relation;
determining position vectors corresponding to the keywords according to position information of the keywords;
determining category vectors of the keywords according to categories respectively corresponding to the keywords;
determining separation vectors of the keywords according to the attribute structure and the conversation structure; wherein the separation vectors of the keywords in the attribute structure are the same, and the separation vectors of the keywords in the conversation structure are the same;
performing para addition on the keyword vectors, the position vectors, the category vectors, and the separation vectors corresponding to same keywords to obtain target vectors to be processed respectively corresponding to the keywords; and
determining a set of the target vectors respectively corresponding to the keywords to be the vector set.

11. The method according to claim 10, wherein prior to the determining position vectors corresponding to the keywords according to position information of the keywords, the method further comprises:
concatenating the keywords in the attribute structure and the keywords in the conversation structure to obtain concatenating results; and
sequentially annotating position information for the keywords in the keyword set according to a keyword sorting order of the concatenating results to obtain the position information of the keywords.

12. The method according to claim 10, wherein the generating a joint semantic vector according to the vector set comprises:
generating matrix groups respectively corresponding to the target vectors according to the vector set, the matrix groups comprising a query matrix, a key matrix, and a value matrix;
calculating self-attention vectors respectively corresponding to the target vectors according to the matrix groups respectively corresponding to the target vectors;
calculating feature vectors corresponding to the self-attention vectors according to a feedforward neural network; and
calculating a joint semantic vector corresponding to the feature vectors based on a self-attention algorithm and the feedforward neural network.

13. A conversation information processing apparatus, comprising:
a processor; and
a memory configured to store executable instructions of the processor;
the processor being configured to execute the executable instructions to:
acquire an attribute structure and a conversation structure that correspond to a target object in response to detecting conversation information to be output; the conversation structure being used for representing the conversation information;
calculate a vector set corresponding to a keyword set; the keyword set comprising keywords in the attribute structure and keywords in the conversation structure;
generate a joint semantic vector according to the vector set, and generate a joint structure vector according to the attribute structure and the conversation structure; and
determine a degree of matching between the target object and the conversation information according to the joint semantic vector and the joint structure vector, and output the conversation information in response to the degree of matching meeting a preset condition.

14. The apparatus according to claim 13, wherein the processor is further configured to:
determine, in response to detecting that a new chat message is displayed in a conversation window, the conversation information corresponding to the new chat message;
wherein the conversation window comprises the target object and at least one conversation object, and the new chat message corresponds to the conversation object.

15. The apparatus according to claim 14, wherein the processor is further configured to select the conversation information from a preset information base according to the new chat message; or generate the conversation information according to the new chat message.

16. The apparatus according to claim 13, wherein the processor is further configured to concatenate the joint semantic vector and the joint structure vector to obtain an integrated vector; perform dimension reduction on the integrated vector to obtain a dimension reduction result; calculate probabilities of the dimension reduction result belonging to preset categories; and represent the degree of matching by the preset category corresponding to the highest probability.

17. The apparatus according to claim 13, wherein the processor is further configured to read the attribute structure corresponding to the target object; and structure the conversation information to obtain the conversation structure.

18. The apparatus according to claim 17, wherein the processor is further configured to compare the conversation information with a preset word set to determine keywords in the conversation information; and construct a conversation structure comprising the keywords in the conversation information according to a preset word relation.

19. The apparatus according to claim 17, wherein the processor is further configured to:
determine a term vector corresponding to the conversation information according to a term vector model;
perform text structure parsing on the conversation information according to the term vector to obtain a semantic relation between linguistic units in the conversation information; and
represent the conversation information as the conversation structure according to the semantic relation.

20. A non-transitory computer-readable storage medium, storing a computer program, the computer program, when executed by a processor, causing the processor to implement:

acquiring an attribute structure and a conversation structure that correspond to a target object in response to detecting conversation information to be output; the conversation structure being used for representing the conversation information;

calculating a vector set corresponding to a keyword set; the keyword set comprising keywords in the attribute structure and keywords in the conversation structure;

generating a joint semantic vector according to the vector set;

generating a joint structure vector according to the attribute structure and the conversation structure; and determining a degree of matching between the target object and the conversation information according to the joint semantic vector and the joint structure vector, and outputting the conversation information in response to the degree of matching meeting a preset condition.

\* \* \* \* \*